Dec. 19, 1922.
P. MONTGOMERY.
SHOCK ABSORBER.
FILED APR. 12, 1919.
1,439,433.
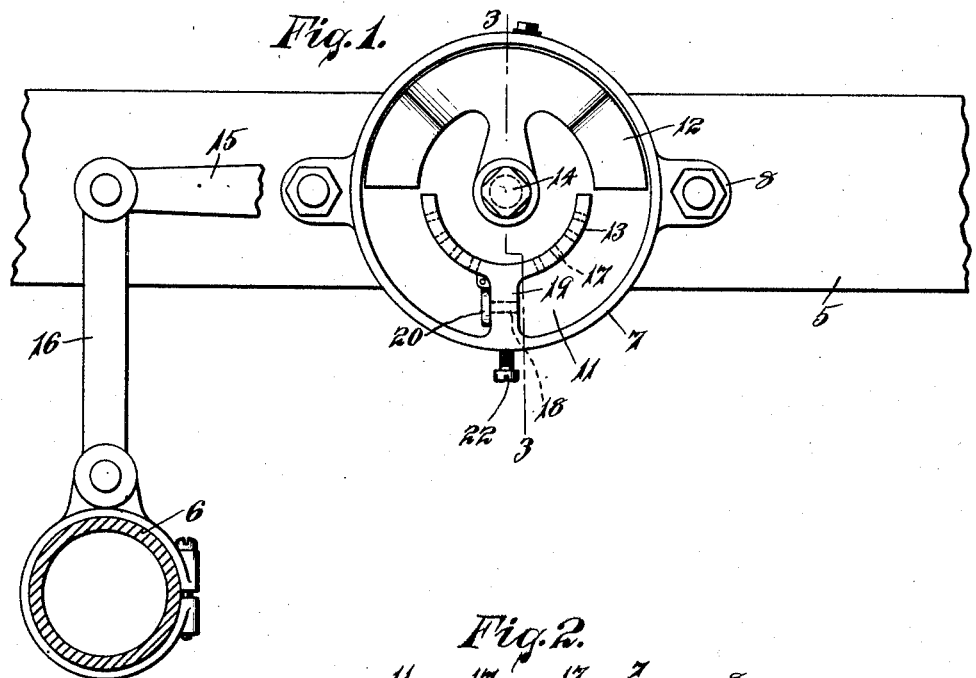
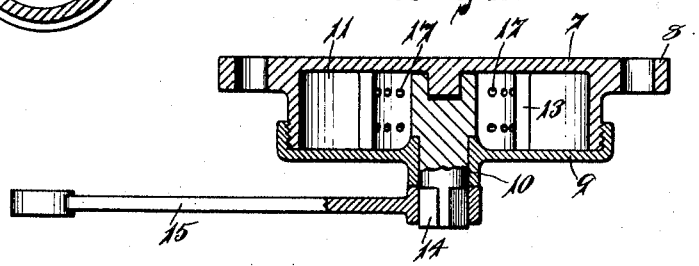
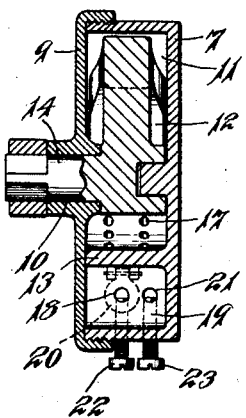
INVENTOR.
Philip Montgomery,
BY
Arthur B. Jenkins
ATTORNEY.

Patented Dec. 19, 1922.

1,439,433

UNITED STATES PATENT OFFICE.

PHILIP MONTGOMERY, OF HARTFORD, CONNECTICUT.

SHOCK ABSORBER.

Application filed April 12, 1919. Serial No. 289,727.

*To all whom it may concern:*

Be it known that I, PHILIP MONTGOMERY, a citizen of the United States, residing in Hartford, in the county of Hartford and State of Connecticut, have invented a new and Improved Shock Absorber, of which the following is a specification.

My invention relates to the class of devices for preventing excessive movement of the body of a vehicle with respect to the axles or wheels, and an object of my invention, among others, is to provide a device of this class that shall be very durable and that shall be extremely effective in the results obtained in its operation.

One form of absorber embodying my invention and in the construction and use of which the objects herein set out, as well as others, may be attained, is illustrated in the accompanying drawings, in which—

Figure 1 is a view in side elevation of a portion of the frame of a vehicle and in cross section through an axle housing equipped with my improved shock absorber, the cover of the case of which is removed.

Figure 2 is a view in central section through my improved shock absorber.

Figure 3 is a view in section on plane denoted by dotted line 3—3 of Figure 1.

While my invention is illustrated and described herein as applied to a vehicle it will be found equally applicable for preventing shock between the reciprocating members of any device.

In the accompanying drawings the numeral 5 indicates a part of a side rail of the frame of a vehicle and 6 the axle housing (shown in section) between which parts it will be understood the springs are arranged in any desired manner, supported upon the axle housing and supporting the frame.

My improved shock absorber is shown herein as attached to both of said parts and it may be employed in such numbers and in such positions as may be desired. It consists of a case 7 having suitable means, as ears 8 for attaching it in place as by means of screws or bolts, and a cover 9 is secured in place in any suitable manner to close a chamber in the case. An opening 10 extends through a wall of this chamber, in the structure shown herein this opening being in the cover 9.

Cylinders 11 are formed within the case to receive pistons or resistance members 12 and these cylinders and pistons may be formed in various ways. A satisfactory arrangement, that herein shown, comprises a wall 13 formed on the arc of a circle to correspond with the shape of the wall of the circular case, thus forming the cylinders on curves extending lengthwise thereof. A shaft or actuating member 14 extends through the opening 10 and supports the pistons 12 that conform to the circular shape of the cylinders, the arc of which has the axis of said shaft for a center. An arm 15 is secured to the shaft outside of the case, the end of the arm away from the case being pivotally attached to a link 16 that is pivotally connected to the housing 6. The wall 13 is located at some distance from the opening 10 and consequently the cylinders 11 are spaced from said opening. This constitutes an important feature of my invention, as all material pressures are confined within the cylinders and the latter being spaced from the opening 10 no pressure is transmitted to liquid at said opening and consequently little if any packing is required around the shaft 14 to prevent escape of liquid from the case. Therefore, there is no danger of the device becoming inoperative by reason of a lowering of the liquid within the case.

It will be understood that a liquid, as oil, will be used in the case, as is common in devices of this class, to oppose movement of the pistons, and it will be noted that the arrangement is such that the case need not be full of liquid to be effectively operative, as the device will operate so long as there is liquid enough to fill the cylinders. The pistons are preferably enlarged at their ends, as shown in Figures 1 and 3 of the drawings.

The device is arranged to prevent excessive movement only, as between the frame and axle housing or wheels, and to resist such movement in proportion to the amount thereof, the greater the excess of movement the greater the resistance. To this end the pistons are located normally outside of the cylinders and are permitted some degree of movement before entering the cylinders, thereby permitting the full effect of the flexibility of the springs to be obtained during the minor movements thereof. This feature is extended by forming relief openings 17 through the wall 13 from each of the cylinders into the main chamber in the case, these openings being of any suitable size. Consequently the greater the extent of movement of the pistons into the cylinders by reason of excessive movement of the axle and frame, the greater will be the resistance to such movement.

It is essential that the resistance to separation of the axles and vehicle frame be greater than the resistance to movement of said parts in the opposite direction as it is invariably the separating movement that causes breaking of the springs. This may be obtained in different ways, as herein shown a port 18 being provided through the dividing wall 19 between the cylinders with a valve 20 to govern this port and so located and operating as to open and permit flow of liquid between the cylinders when the frame and axles approach each other and to prevent such flow and thereby increase the resistance to movement of the pistons when the frame and axles move in an opposite direction.

A regulating port 21 is also formed through the wall 19, and the size of the ports 18 and 21 are regulated as by means of screws 22—23 extending through the case into the ports as shown in Figure 3 of the drawings. By means of these screws the rate of flow of liquid from one of the pistons to the other may be so regulated as to govern the movement of the pistons according to the conditions that may be imposed as to weight or otherwise.

In accordance with the provisions of the patent statutes, I have described the principles of operation of my invention, together with the device which I now consider to represent the best embodiment thereof; but I desire to have it understood that the device shown is only illustrative, and that the invention may be carried out by other means.

I claim—

1. A case including a chamber to contain a liquid, a resistance member movably mounted in said chamber and arranged to have its movement opposed by said liquid, an actuating member connected to the resistance member and extending through and movable in an opening into said chamber, and means to prevent transmission to said opening of the pressure of the liquid caused by movement of said resistance member.

2. A case to contain a liquid and having a compartment therein, a resistance member movably mounted within said compartment and arranged to have its movement opposed by said liquid, an actuating member connected to the resistance member and extending through and movable in an opening into said compartment, and means within the case to prevent transmission to said opening of the pressure of the liquid caused by movement of said resistance member.

3. A case containing a cylinder therein and having an opening through its wall sequestered from said cylinder, liquid in all parts of said case, a piston located within the cylinder, and a member connected to said piston and extending through said opening.

4. A case to contain a liquid and having an opening through its wall, a cylinder located within the case and separated from said opening, a member rotatably mounted in the case and projecting through an opening in the wall thereof, a piston secured to said member and adapted to project into said cylinder.

5. A case to contain a liquid and having an opening through its wall, cylinders oppositely disposed within the case, the wall of the cylinders being spaced from said opening, a member rotatably mounted in the case and projecting through an opening in the wall thereof, pistons supported by said member and adapted to be projected into said cylinders.

6. A case to contain a liquid and having an opening through its wall, a cylinder located within the case and spaced from said opening, a port through the wall of the cylinder to permit flow of liquid therefrom, a member movably mounted in the case and projecting through an opening in the wall thereof, a piston supported by said member and adapted to be projected into said cylinder.

7. A case to contain a liquid and having an opening through its wall, a cylinder located within the case and spaced from said opening, a port opening through the wall of said cylinder, means for regulating the size of said port, a member movably mounted within the case and projecting through an opening in the wall thereof, a piston supported by said member and adapted to be projected into said cylinder.

8. A case to contain a liquid and having an opening in its wall, a cylinder formed on the arc of a circle within the case and spaced from said opening, openings disposed lengthwise of the cylinder through its walls, a member rotatably mounted in the case and projecting through an opening in the wall thereof, a piston formed on the arc of a circle and supported by said member and adapted to be projected into said cylinder.

9. A case to contain a liquid and having an opening thereinto, cylinders located in said case and spaced from said opening, said cylinders opening in opposite directions, a member rotatably mounted in said opening, pistons supported by said member and extending in opposite directions into positions to enter said cylinders, and means for controlling flow of fluid between said cylinders.

PHILIP MONTGOMERY.